United States Patent [19]

Lee

[11] Patent Number: 4,856,865
[45] Date of Patent: Aug. 15, 1989

[54] TUNABLE SPLICE FOR FIBER OPTICS

[75] Inventor: Nicholas A. Lee, Eagan, Minn.

[73] Assignee: Minnesota Mining and Manufacturing Company, St. Paul, Minn.

[21] Appl. No.: 145,132

[22] Filed: Jan. 19, 1988

[51] Int. Cl.$^4$ .................................................. G02B 6/38
[52] U.S. Cl. .............................. 350/96.21; 350/96.20
[58] Field of Search ............... 350/96.20, 96.21, 96.29

[56] References Cited

U.S. PATENT DOCUMENTS

| | | | |
|---|---|---|---|
| 3,800,388 | 4/1974 | Börner et al. ...................... 29/200 P |
| 4,019,806 | 4/1977 | Fellows et al. .................... 350/96 C |
| 4,239,333 | 12/1980 | Dakss et al. ....................... 350/96.21 |
| 4,470,180 | 9/1984 | Blomgren .............................. 24/563 |
| 4,738,507 | 4/1988 | Palmquist .......................... 350/96.20 |

*Primary Examiner*—William L. Sikes
*Assistant Examiner*—Robert E. Wise
*Attorney, Agent, or Firm*—Donald M. Sell; Walter N. Kirn; Stephen W. Buckingham

[57] ABSTRACT

A fiber optic splice includes two cylindrical ferrules of different diameters and having bores parallel to, but offset from, the major axes of the ferrules. The ferrules are inserted into a deformable housing where they rest in a V-groove. When external pressure is applied to the housing it is deformed in a predetermined manner, allowing the ferrules to rotate and when the pressure is removed, the ferrules are held in place.

23 Claims, 2 Drawing Sheets

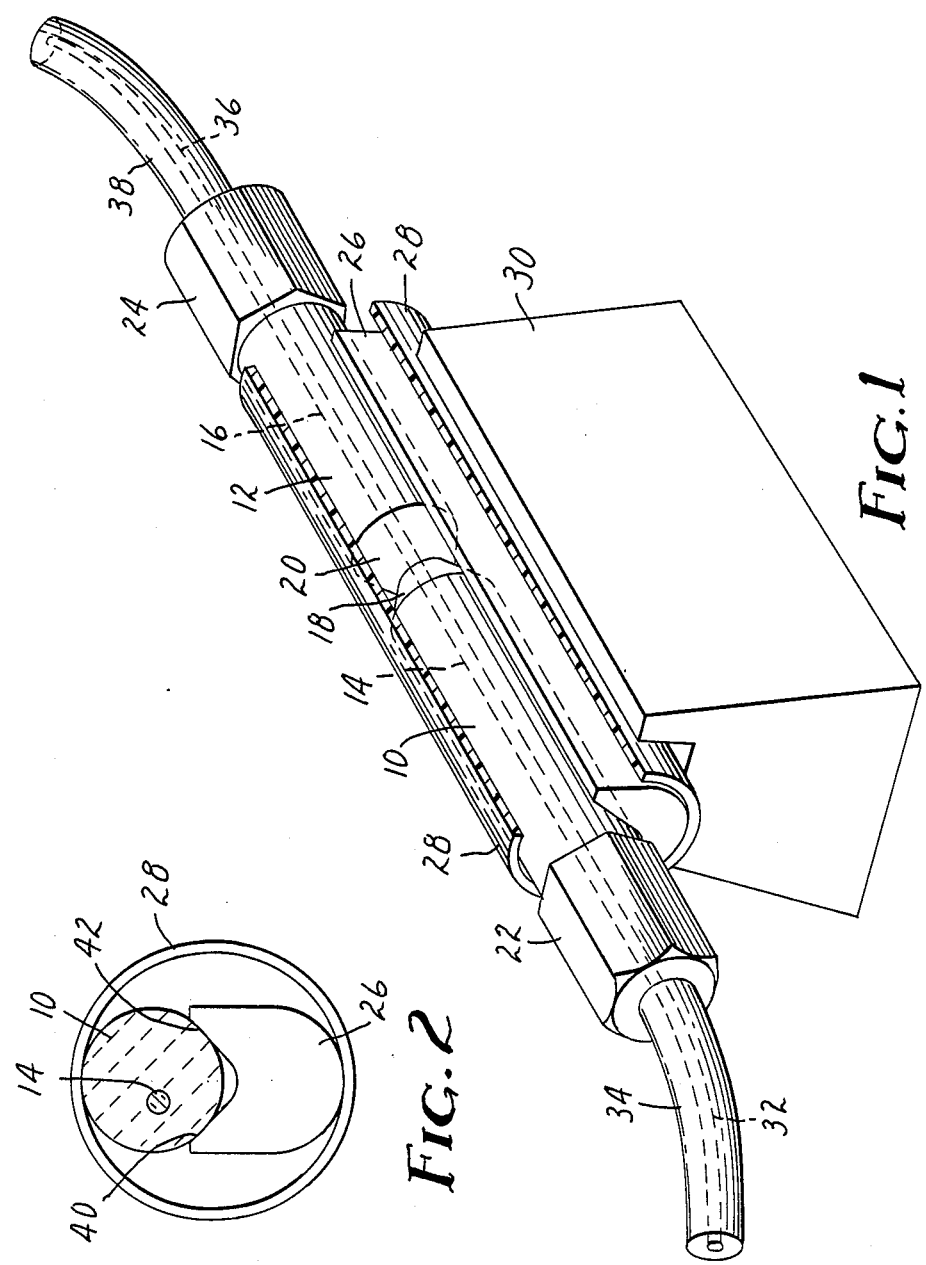

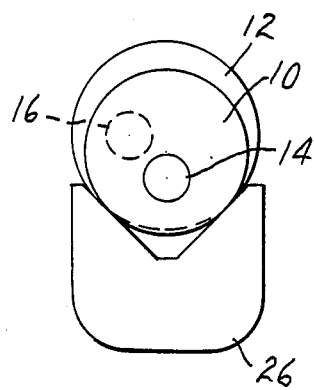
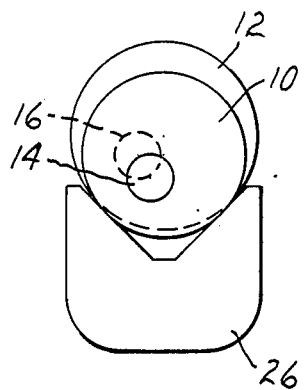
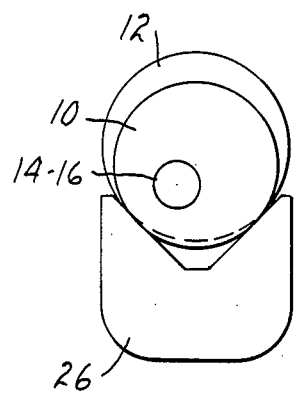
FIG.3A　　　FIG.3B　　　FIG.3C
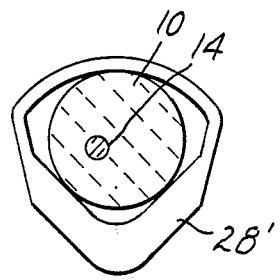
FIG.4

TUNABLE SPLICE FOR FIBER OPTICS

TECHNICAL FIELD

The present invention relates to tunable splices for optical fibers.

BACKGROUND ART

Often it is necessary to couple a signal from one optical fiber to another. The couplings used, commonly known as splices, must be very precisely manufactured. This is to ensure that the fibers are accurately aligned so that light emerging from one fiber enters the other. In order to reduce the precision required, a tunable splice is sometimes used. In a tunable splice the alignment may be adjusted to ensure maximum signal transmission.

Another advantage of tunable splices lies in the ability to use such splices as variable attenuators. In a common situation, light from a light source, such as a laser diode, is transmitted by optical fibers to a detector. If the light received by the detector is too intense, the detector will go into saturation and be unable to accurately measure changes in intensity. Thus, information contained in the signal transmitted will be lost. This problem may be overcome with a tunable splice by slightly detuning it to attenuate the signal. Furthermore, the output of a semiconductor laser will commonly reduce over time as the laser ages. If this occurs the tunable splice may be adjusted to remove the attenuation and keep signal levels constant.

U.S. Pat. No. 3,800,388, issued to Manfred Borner et al. teaches a tunable splice wherein the fibers to be spliced are placed in holders, each of which is designed to be rotated around an axis. The axis of rotation of the holders are parallel but non-collinear. Each fiber runs through its respective holder in a direction parallel to but not on the axis of rotation thereof. By independently rotating the two holders the fibers may be aligned. After alignment the holders are secured in place. The process of securing the fibers in the Borner et al. splice can cause problems by partially dealigning the fibers.

U.S. Pat. No. 4,019,806, issued to Daniel Fellows et al. teaches the use of two cylindrical holders which are placed in a channel known as a V-groove. Each holder has an optical fiber running therethrough on an eccentric to the axis of the holder. One of the holders has its axis of rotation shifted with respect to the other through the use of a small shim which is placed along one wall of the V-groove. Such an approach reduces the likelihood of detuning when the holders are secured, but requires very precise manufacture of the holders and of the shim.

U.S. Pat. No. 4,239,333, issued to Mark L. Dakss et al. describes a fiber optic splice having a cylindrical plug for each fiber, each plug having a bore along its axis through which the respective fiber is inserted. These plugs are then inserted into sleeves in a pair of cylindrical supports. The sleeves are set eccentric to the supports so that the supports may be rotated to align the fibers. The axis of rotation of the two supports are adjusted to be different either by using a shim, as is done in Fellows et al., or by designing the supports to have different diameters. The system of Dakss et al. requires extremely close tolerances for the plugs and the sleeves in order to achieve and maintain alignment of the fibers.

SUMMARY OF THE INVENTION

The present invention uses two cylindrical holders or ferrules having different diameters. Each ferrule has a bore which is parallel to but offset from the axis of the ferrule such that when the ferrules are rotated the bores may be aligned with each other. The optical fibers are inserted into these bores. The ferrules are placed in a V-groove inside of a deformable housing. When pressure is applied to the sides of the deformable housing the ferrules may be easily inserted and turned until they are aligned. When pressure is released from the sides of the deformable housing the ferrules are held tightly in place ensuring that the alignment is maintained.

BRIEF DESCRIPTION OF DRAWINGS

FIG. 1 is a drawing of an embodiment of the invention;

FIG. 2 is a schematic cross-sectional drawing of an assembled splice;

FIGS. 3A, 3B, and 3C are schematic cross-sectional drawings illustrating the alignment process; and FIG. 4 is a schematic cross-sectional drawing of an alternative embodiment of the invention.

DETAILED DESCRIPTION

FIG. 1 illustrates a preferred embodiment of the invention. The splice of the invention includes ferrules 10 and 12 which have bores 14 and 16 respectively. Ferrules 10 and 12 are cylindrical and have tapered ends 18 and 20, respectively. The use of tapered ends reduces the size of the end faces, and thus the size of the area which must be precision polished when polishing the mating ends of the optical fibers. The opposite ends of ferrules 10 and 12 have enlarged portions 22 and 24 respectively. Enlarged ends 22 and 24 are provided in order to allow easy gripping with fingers or a tool for tuning the splice.

Ferrules 10 and 12 are mounted in a block 26 having a V-groove therein. Block 26 may be made of any rigid material. In experimental models, it was made of metal although other materials such as plastics or ceramics could be utilized.

In order to join two optical fibers with the splice of the invention, a first fiber 32 has a portion of its protective coating 34 removed and the fiber is inserted into bore 14 of ferrule 10. Similarly, fiber 36 with a portion of its protective coating 38 removed is inserted into bore 16 of ferrule 12. Protective coatings 34 and 38 may be affixed to the ferrules using an adhesive capable of bonding effectively to both the material of which the ferrule is made and protective coatings 34 and 38.

Support block 26 is inserted into deformable housing 28. Deformable housing 28 may be, for example, a plastic material. Ferrules 10 and 12 are inserted into deformable housing 28 and lie in the V-groove of support block 26. When deformable housing 28 is deformed in a predetermined manner by externally-applied pressure, ferrules 10 and 12 may be rotated. When such pressure is released, deformable housing 28 holds ferrules 10 and 12 in place.

In a preferred embodiment a jig 30 has a groove appropriately sized so that deformable housing 28 may be placed therein to apply such pressure. With deformable housing 28 under pressure, ferrules 10 and 12 are inserted therein. If desired, a suitable fluid for index of refraction matching may be placed between ferrules 10 and 12. Ferrules 10 and 12 are then rotated until the splice is tuned for the desired level of transmission. When such tuning is complete the pressure on deformable housing 28 is released allowing it to resume its normal shape. When deformable housing 28 returns to its normal shape it will frictionally hold ferrules 10 and 12 in place and prevent detuning of the splice.

A wide variety of materials may be used to construct each of the portions of the invention. The key requirement for deformable housing 28 is that it must be of a resilient material. Thermoplastics generally have the required resiliency and are easy to form into the desired shape. Acetal was used effectively in prototype versions of the invention. Other thermoplastics that could be used include polysulfone, polyetherimide, and acylonitrile-butadiene-styrene. Alternatively a resilient metal such as stainless steel could be used for deformable housing 28. In contrast ferrules 10 and 12 should be made of rigid materials. Ceramic materials which could be used include zirconia, alumina, and calcium titanate. Metallic ferrules could also be used. The materials chosen in a particular implementation will be chosen by factors such as cost and the environment in which the splice is to be used.

FIG. 2 shows a cross section of an assembled splice. Shown in FIG. 2 are ferrule 10, block 26 and deformable housing 28. Block 26 has a V-groove which has sides 40 and 42. In the preferred embodiment sides 40 and 42 are at a right angle to one another. FIGS. 3A, 3B and 3C are end views of block 26 and ferrules 10 and 12 to illustrate the tuning process. Deformable housing 28 is omitted from FIGS. 3A, 3B and 3C for clarity, but it should be understood that normally the tuning would occur when block 26 and ferrules 10 and 12 are inserted in deformable housing 28.

As shown in FIG. 3A, bores 14 and 16, and thus the fibers therein, are completely unaligned and no light would be transmitted. Ferrules 10 and 12 are rotated as shown until, as shown in FIG. 3B, they are partially aligned. This allows some light to be transmitted through the splice. Ferrules 10 and 12 continue to be rotated as shown in FIG. 3B until bores 14 and 16 are completely aligned as shown in FIG. 3C. When the ferrules are aligned as shown in FIG. 3C, light transmission through the splice will be maximized. Those skilled in the art readily perceive that bores 14 and 16 may be left only partially aligned in order to use the splice of the invention as an attenuator, if such attenuation is desired.

FIG. 4 shows a portion of an alternative embodiment of the invention. In the embodiment of FIG. 4, block 26 has been eliminated and deformable housing 28 has been modified to form deformable housing 28'. The V-groove of block 26 has been replaced by a V-groove which is an integral portion of deformable housing 28'. For these purposes the term integral shall be understood to mean that the V-groove and the housing are formed as a single piece.

What is claimed is:

1. A tunable fiber optic connector comprising
   a deformable housing;
   a V-groove block in said housing; and
   first and second ferrules inserted in said housing and lying in said V-groove such that when said housing is deformed in a predetermined manner by externally applied pressure said ferrules may be rotated and when said pressure is released, said ferrules are held in place, said ferrules having first and second diameters respectively, said first and second diameters being unequal, and each of said ferrules having a major axis and a bore for receiving and holding an optical fiber parallel to but offset from said major axis.

2. The connector of claim 1 wherein said ferrules are of a ceramic material.

3. The connector of claim 2 wherein said housing is of a plastic material.

4. The connector of claim 3 wherein said plastic material is a thermoplastic.

5. The connector of claim 4 wherein said thermoplastic is acetal.

6. The connector of claim 3 wherein said V-groove block is an integral part of said housing.

7. The connector of claim 1 wherein said V-groove block is an integral part of said housing.

8. The connector of claim 7 wherein said housing is of a plastic material.

9. The connector of claim 8 wherein said plastic material is a thermoplastic.

10. The connector of claim 9 wherein said thermoplastic is acetal.

11. The connector of claim 1 wherein said V-groove block is of a ceramic material.

12. The connector of claim 11 wherein said ferrules are of a ceramic material.

13. The connector of claim 11 wherein said housing is of a plastic material.

14. The connector of claim 13 wherein said plastic material is a thermoplastic.

15. The connector of claim 14 wherein said ferrules are of a ceramic material.

16. The connector of claim 1 wherein said V-groove block is of metal.

17. The connector of claim 16 wherein said ferrules are of a ceramic material.

18. The connector of claim 16 wherein said housing is of a plastic material.

19. The connector of claim 18 wherein said plastic material is a thermoplastic.

20. The connector of claim 19 wherein said ferrules are of a ceramic material.

21. The connector of claim 1 wherein said housing is of a plastic material.

22. The connector of claim 21 wherein said plastic material is a thermoplastic.

23. The connector of claim 22 wherein said thermoplastic is acetal.

* * * * *